US010242561B1

(12) United States Patent
Davies et al.

(10) Patent No.: US 10,242,561 B1
(45) Date of Patent: Mar. 26, 2019

(54) CORNER SECURITY DETECTION DEVICE

(71) Applicant: Overview Technologies, Inc., Encino, CA (US)

(72) Inventors: Christopher Paul Davies, Perth (AU); Scott Anthony Rhodes, Perth (AU)

(73) Assignee: Overview Technologies, Inc., Encino, CA (US)

( * ) Notice: Subject to any disclaimer, the term of this patent is extended or adjusted under 35 U.S.C. 154(b) by 0 days.

(21) Appl. No.: 15/895,966

(22) Filed: Feb. 13, 2018

Related U.S. Application Data

(60) Provisional application No. 62/458,307, filed on Feb. 13, 2017.

(51) Int. Cl.
*G01J 5/02* (2006.01)
*G08B 29/18* (2006.01)
*G08B 13/19* (2006.01)

(52) U.S. Cl.
CPC ........... *G08B 29/185* (2013.01); *G08B 13/19* (2013.01)

(58) Field of Classification Search
CPC .. G08B 29/185; G08B 13/19; G08B 13/2494; G08B 13/19602; G01V 8/20; H04N 5/2252; H04N 7/188; H04N 7/181; G01J 5/0025; G01J 5/10; G01J 5/0806
See application file for complete search history.

(56) References Cited

U.S. PATENT DOCUMENTS 4,746,906 A * 5/1988 Lederer .............. G08B 13/1645 250/336.1
5,089,704 A * 2/1992 Perkins ................ G08B 13/193 250/342
5,332,902 A * 7/1994 Bellis ..................... G08B 13/19 250/342
5,557,106 A * 9/1996 Ioco .......................... G01J 5/08 250/353
5,929,445 A * 7/1999 Barone ................ G08B 13/193 250/353
7,115,871 B1 * 10/2006 Tracy ................... G08B 13/193 250/349
7,488,941 B2 * 2/2009 Lee ..................... F21V 23/0442 250/342
8,970,374 B2 * 3/2015 Guetta .................. G01S 17/026 340/555
9,922,535 B2 * 3/2018 Matsuoka ............ G08B 25/001
2004/0129883 A1 * 7/2004 Dougherty ........... G08B 13/191 250/338.3
2006/0201964 A1 9/2006 DiPerna et al.
2006/0271952 A1 11/2006 Gurley et al.
2007/0018106 A1 * 1/2007 Zhevelev .................. G01J 5/08 250/353

(Continued)

FOREIGN PATENT DOCUMENTS

JP 2008242745 A 10/2008
JP 2008305038 A 12/2008
JP 2010152677 A 7/2010

*Primary Examiner* — An T Nguyen
(74) *Attorney, Agent, or Firm* — Avyno Law P.C.

(57) ABSTRACT

A security detection device and system for reducing false triggers is provided. The security detection device is a corner mount devices that may be mounted on the outside corners of building and structures. The security detection device may further communicate via a communications data network with other security detection devices to a community server to create a shared community alarm system.

19 Claims, 7 Drawing Sheets

(56) References Cited

U.S. PATENT DOCUMENTS

| | | | | |
|---|---|---|---|---|
| 2007/0096902 | A1 | 5/2007 | Seeley et al. | |
| 2007/0146127 | A1* | 6/2007 | Stilp | G08B 1/08 340/531 |
| 2007/0152807 | A1 | 7/2007 | Huang et al. | |
| 2008/0042832 | A1* | 2/2008 | DiPoala | G08B 13/19 340/541 |
| 2010/0124900 | A1 | 5/2010 | Liu et al. | |
| 2011/0111728 | A1 | 5/2011 | Ferguson et al. | |
| 2011/0319051 | A1 | 12/2011 | Reitnour | |
| 2012/0092161 | A1 | 4/2012 | West | |
| 2012/0225635 | A1 | 9/2012 | Esbensen | |
| 2012/0252399 | A1 | 10/2012 | Saito et al. | |
| 2013/0099124 | A1* | 4/2013 | Filson | G05D 23/1902 250/349 |
| 2013/0183924 | A1 | 7/2013 | Saigh et al. | |
| 2014/0028473 | A1* | 1/2014 | Ryan | G01R 33/10 340/907 |
| 2014/0071274 | A1 | 3/2014 | Golden | |
| 2014/0278281 | A1 | 9/2014 | Vaynriber et al. | |
| 2015/0022316 | A1* | 1/2015 | Dixon | G08B 25/001 340/5.51 |
| 2015/0294569 | A1* | 10/2015 | Ryan | G01R 33/10 340/909 |
| 2016/0142891 | A1* | 5/2016 | Virhia | G06Q 10/00 340/870.07 |
| 2016/0171856 | A1* | 6/2016 | Haines | G08B 13/2494 340/539.23 |
| 2016/0240056 | A1* | 8/2016 | Chen | G08B 13/2491 |
| 2016/0328941 | A1* | 11/2016 | Sundholm | G08B 13/1618 |
| 2017/0171943 | A1* | 6/2017 | Moller | F21S 6/003 |
| 2017/0205289 | A1* | 7/2017 | Purohit | G01J 5/0806 |
| 2017/0225680 | A1* | 8/2017 | Huang | B60R 21/0134 |
| 2018/0089975 | A1* | 3/2018 | Amir | G08B 21/0469 |
| 2018/0103361 | A1* | 4/2018 | Virhia | G06Q 10/00 |

* cited by examiner

FIG. 2A
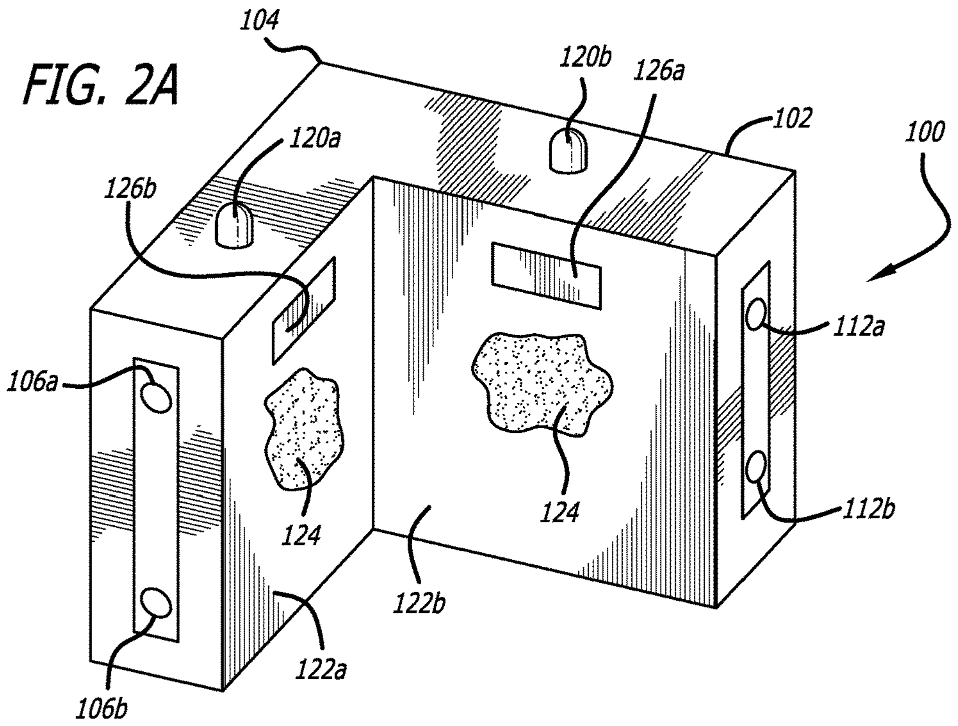
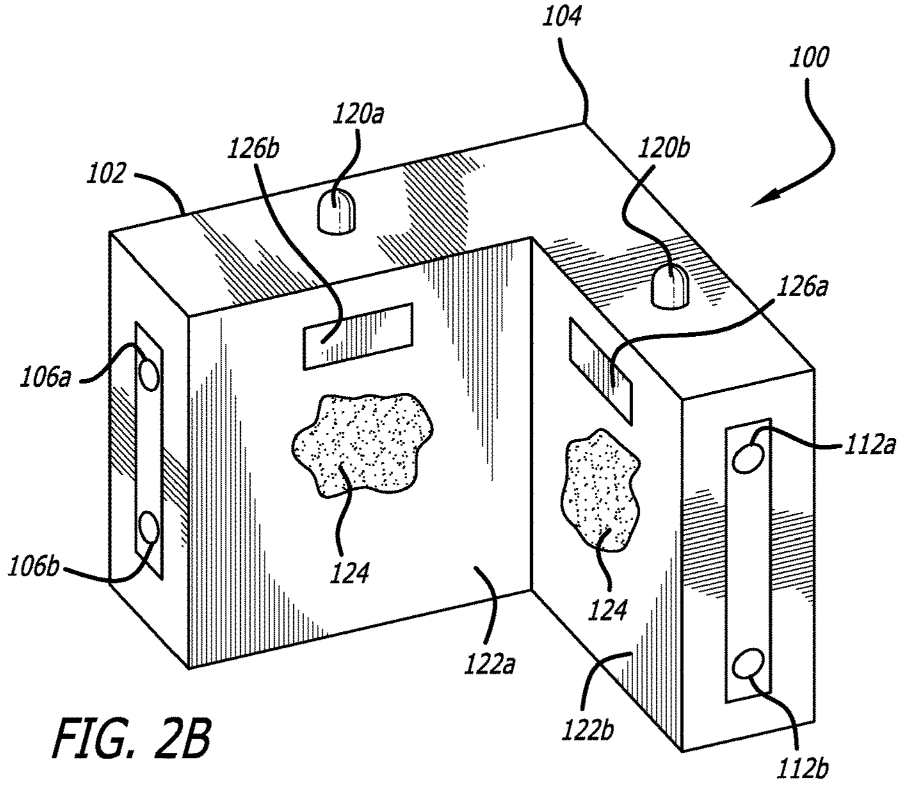
FIG. 2B

CORNER SECURITY DETECTION DEVICE

CROSS-REFERENCE TO RELATED APPLICATIONS

This application claims priority to U.S. Provisional application 62/458,307, titled CORNER SECURITY DETECTION DEVICE, filed on Feb. 13, 2017, which is incorporated by reference herein.

FIELD OF INVENTION

The invention relates to a passive infrared (PIR) corner motion detection device for use standalone or in connection with a security system that reduces false alarm triggers.

BACKGROUND OF THE INVENTION

Many existing security systems employ PIR sensors to detect a potential intruder. There is, however, a problem with security systems based upon the prior art, in that there is the potential for non-human "false alarm" triggers. Preventing false alarms and ensuring detection is of great importance to PIR motion detectors used in the security industry, as "false alarms" cause the stakeholders to lose confidence in the conventional alarm system as a reliable indicator of an intruder incursion leading to the conventional security system no longer being armed, making the security system mute.

In addition, PIR sensors in existing security systems are generally mounted internally and are part of an alarm system that is housed within the same building. These PIR sensors, when triggered, send an alert to the alarm control panel, which in turn activates the system's single strobe light. The intruder has already entered the property before any deterrent is initiated.

Conventional alarm system detectors are also generally placed internally, within a building, and these detectors often need to be hardwired and/or installed by a professional alarm system installer. Moreover, conventional alarm systems are often powered by the main electrical system of the structure in which they are located. They are thus vulnerable to power failures affecting the structure itself.

The prior art teaches various approaches to reducing the incidence of "false alarms" in alarm systems. For example in U.S. Pat. No. 4,614,938 to Weitman and U.S. Pat. No. 4,963,749 to McMaster disclose the use of a single quad PIR sensor having four IR sensitive elements, as well as two PIR sensor devices each having a pair of IR sensitive elements. The advantage of two channels over one is simply greater reliability of sensor output signal. An alarm signal is thus only generated when both channels indicate motion.

In U.S. Pat. No. 4,697,081 to Baker, a quad element sensor is disclosed in which interdigitated IR sensitive elements are provided. By this arrangement, both IR elements respond to infrared radiation collected by the lens, and the risk of false triggering is reduced. In U.S. Pat. No. 5,045,702 to Mulleer, a single channel detector is disclosed in which the sensor element configurations include a diamond pattern with opposed pairs of IR sensitive elements of opposite polarization connected in series. Such motion detectors typically employ a single lens to direct infrared radiation onto the single quad or multi-element sensor.

It is also known in the art to provide dual lens and dual sensor motion detectors. Such systems conventionally have a single housing with two lenses mounted one above the other. Each sensor receives radiation from one corresponding lens. The optical arrangement is such that infrared radiation from a person entering a detection zone will not be simultaneously received by both sensors, but rather sequentially. The response from the sensors is thus separated in time, and has a same polarity since the sensor IR sensitive elements of the two sensors are aligned parallel with like polarity. Such a dual channel motion detector can generate an alarm accurately when the response in both channels is similar and separated in time by the expected amount.

Thus, a need exists for a security system that provides security devices that may be installed on the exterior of a building or structure that not only efficiently prevents false alarms but also allows for communication with other similar security devices to create a community security alarm system.

SUMMARY OF THE INVENTION

The present invention is directed toward improvements in security system sensors. More specifically, the invention uses PIR detection in an external environment in a way that reduces false alarm triggers. A sensor in accordance with an aspect of the invention comprises a corner articulated casing. Two PIR sensors and a strobe light are housed within each side of the detection device. This corner articulated casing allows the device to be mounted on the external corner of a structure, between waist and shoulder height and paired. Each pair of PIR sensors forms a vertically spaced, horizontally separated detection zone. The detection zone for a pair of PIR sensors is triggered in order for an alarm state to be determined. Detection zone triggers are shared with adjacent or consecutive zones through a self-propagating data network within a community, creating an overall enhanced and highly effective security system.

Because the detector is mounted on the outside of the building and has a strobe light built into each side, once a detection zone has been tripped, the strobe light is turned on by the detector, informing the intruder that he has been detected prior to entering the building.

In addition, as the corner detection device is placed on the outside of a building, it is possible to take advantage of solar energy to keep the detection device charged. The device is also truly wireless, because no hardwiring is required to install it, is easily mounted at between waist and shoulder height using a two stage fixing system and is part of a self-propagating data network. As a result, the device does not need to be professionally installed, but may be readily self-installed by the user.

In one example, the detection device includes two halves pivotally connected to each other where each half includes passive infrared sensors and where the device further including a microprocessor, a transceiver and a power source. The device further includes a rectangular-shaped opening positioned in front of each PIR lens to vertically narrow the field of view, forming a horizontal detection plane. By adjusting the vertical position of this opening with respect to the center of the PIR detection device, the angular difference to horizontal of the narrowed field of view (horizontal detection plane) can be angled in an upward or downward direction. Two non-intersecting vertically separated horizontal detection planes form a single human detection zone to eliminate false triggers—these must be triggered concurrently for a valid detection. In this manner, a single detector may have two individual human detection zones—one that looks left, the other that looks right.

The articulated halves of the device further allow the device to operate as an external corner mount, flat wall mount or internal corner mount. In certain examples, the device may be designed to automatically negotiate with and join a wireless self-propagating data communications network. In other examples, the device may be solar powered, may have integrated visual & audible annunciators, standalone operation and Wi-Fi access. The device may further be designed with capabilities of integration into a community security system and may employ GPS tagging for relevant detection relationships.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

FIG. 2A is a right side elevated perspective view of the rear side of the corner detection device of the present invention.

FIG. 2B is a left side elevated perspective view of the rear side of the corner detection device of the present invention.

DETAILED DESCRIPTION OF THE INVENTION

Figure 1A:
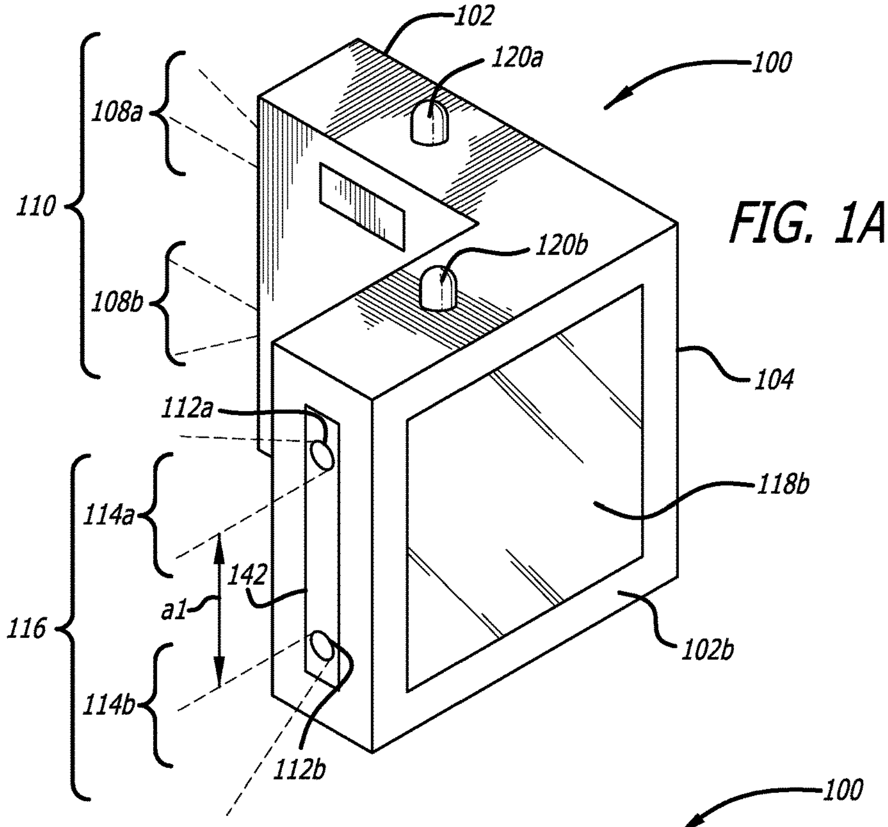
FIG. 1A is a left side elevated perspective view of the front side of the corner detection device of the present invention.

FIGS. 1 through 6 illustrate a corner detection device 100 that operates effectively in an external environment. The corner detection device 100 can be used standalone or in connection with a security system that reduces false alarm triggers.

In one example of the present invention, the invention may also allow geo-coordinate equipment tagging to be attached to corner detection devices 100 at the time of system installation. This geo-coordinate tagging allows the absolute position of each detection device to be recorded on a community server so that detection zone triggers can be shared. Detection zone triggers are shared with adjacent or consecutive zones on other corner detection devices, via a self-propagating data network to create an overall enhanced and highly effective community security system.

The present invention may also be designed such that the detection device is able to be self-installed, as there is no physical wire connection required, and may be installed without the use of tools or screws. Securing the unit may be facilitated with a two stage adhesive fixing method. The first adhesive is a gum like adhesive pad for instant bonding to the wall while the second is a gel like adhesive requiring a curing time to provide a high strength bond.

Additionally, the present invention may include three unique modes of operation. The first mode may respond locally to detection with the activation of a sensory alert. The second mode may transmit a change of state, such as a zone detection, tamper, low battery warning etc. by, for example, through the self-propagating data communications network to a community server for further processing. The third mode may be to receive action commands from the community server by the self-propagating data communications network to change local settings, such as armed or disarmed etc., and the control of sensory alerts within the detection device.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Figure 1B:
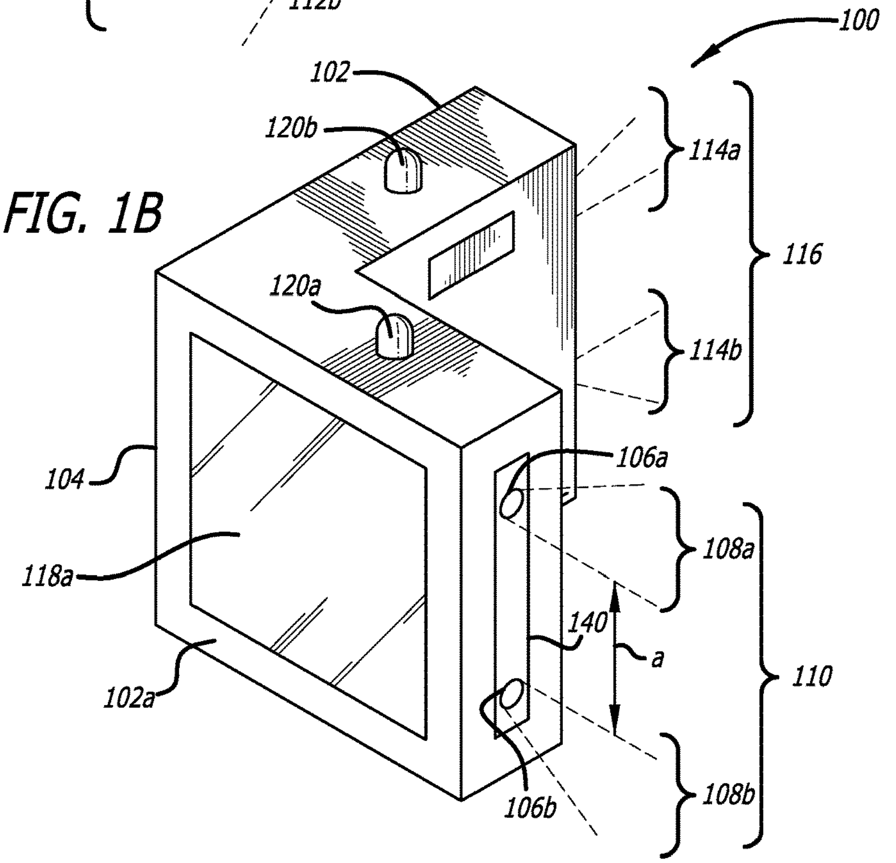
FIG. 1B is a right side elevated perspective view of the front side of the corner detection device of the present invention.

Referring now to the drawings and in particular to FIGS. 1A and 1B, which are left and right side elevated perspective views of the front side of the corner detection device 100 of the present invention, one example of an implementation of the detection device 100 of the present invention is illustrated. As shown on FIGS. 1A and 1B, the detection device 100 includes a casing 102 that may be articulated along a central axis 104. The casing 102 for the detection device 100 may be articulated using angular detent points on the central axis 104 to match the required angular difference between two detection zones. Typically, this could be the external corner of a building. The casing 102 may be square or rectangular-shaped, although it may also be of any other shape (e.g. circular), as long as it can be articulated along a central axis 104 so as to provide two equal halves and permit attachment on an external corner of a building or structure.

As shown in FIGS. 1A and 1B, the casing 102 for the detection device 100 comprises two halves 102*a*, 102*b*, that are each quadrilaterally shaped, although they may also be of any other shape (e.g. semi-circular), as long as each half is formed and/or pivots around a central axis 104 so as to permit attachment on an external corner of a building.

FIG. 1A illustrates the left front side 102*b* of the housing 102, which includes a conventional PIR sensor 112*a* facing in the direction of the left side of the casing 102. The field of view of this PIR sensor 112*a* is modified so that its field of view 114*a* is narrowed, forming a horizontal plane. The left side 102*b* of the casing 102 also contains a second conventional PIR sensor 112*b* facing in the same direction as the PIR sensor 112*a*. The field of view of PIR sensor 112*b* is also modified by a lens and narrowed opening so that its field of view 114*b* is narrowed, forming a second horizontal plane. The fields of view 114*a*, 114*b* are vertically separated by distance a1 so that the fields of view do not overlap. These two fields of view 114*a*, 114*b* co-operatively form the left detection zone 116 for the detection device 100. PIR sensors 112*a* and 112*b* may further be housed in opening 142.

FIG. 1B illustrates the right front side 102*a* of the casing 102, which includes conventional PIR sensor 106*a* facing in the direction of the right side of the casing 102. The field of view of this PIR sensor 106*a* is modified by a lens and narrowed opening so that its field of view 108*a* is narrowed, forming a horizontal plane. The right front side 102*a* of the casing 102 also contains a second conventional PIR sensor 106*b* facing in the same direction as the PIR sensor 106*a*. The field of view of PIR sensor 106*b* is also modified so that its field of view 108*b* is narrowed, forming a second horizontal plane. The fields of view 108*a*, 108*b* are vertically separated by distance a such that the fields of view do not overlap. These two fields of view 108*a*, 108*b* co-operatively form the right detection zone 110 for the detection device 100. PIR sensors 106*a* and 106*b* may further be housed in opening 140. While in the example shown in FIGS. 1A and 1B, the detection device 100 includes four separate PIR sensors 106*a*, 106*b*, 112*a*, 112*b*, those skilled in the art will recognize more or less PIR sensors may be housed within the casing 102.

Figure 6:
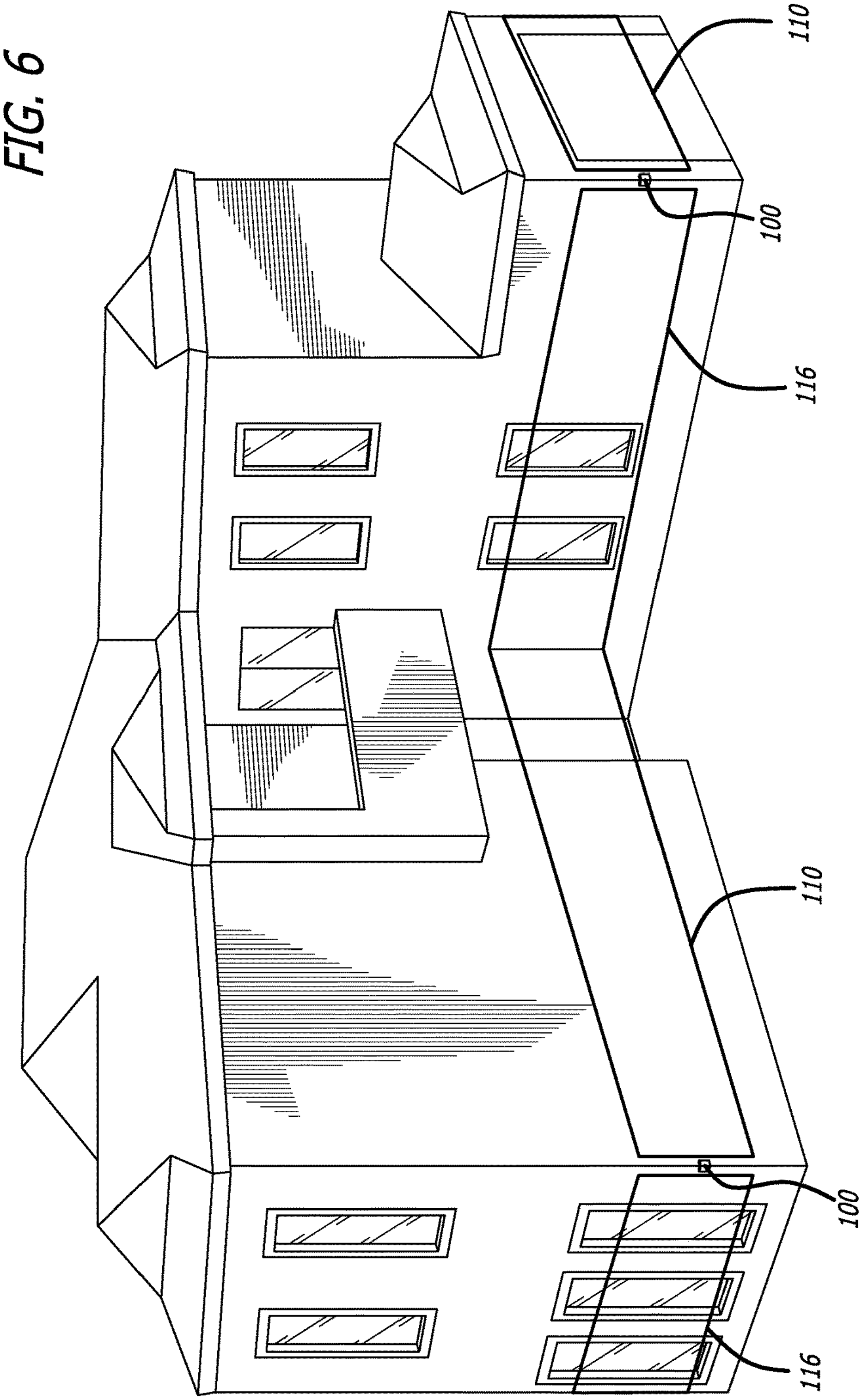
FIG. 6 is one example of the security system of the present invention in operation.

The corner detection device 100 may be installed on the outside corner of a building between waist and shoulder height. While the two halves 102*a* and 102*b* may be contained in one housing or casing were the two halves 102*a* and 102*b* are positioned at predetermined fixed angles in relation to one another (e.g. a fixed 90 degree angle as illustrated in FIGS. 1A and 1B), the two halves 102*a*, 102*b* of the detection device may also be articulated about a central axis 104 by a pivot shaft, flexible material or other movable means to match the angle of a corner of a building or structure. The two halves 102*a* and 102*b* may be articulated (either fixed or through any movable means) from 90 to 270 degrees around the central vertical axis 104 to match the angle of the wall so that the right rear surface 122*a* of half 102*a* may abut the right side of a wall and the left rear surface 122*b* of half 102*b* may abut the left side of a wall, as illustrated in FIG. 6.

Opening 140, 142 is positioned in front of each PIR lens to vertically narrow the field of view, forming a horizontal detection plane 108*a*, 108*b*, 114*a*, 114*b*. By adjusting the vertical position of this opening with respect to the center of the PIR detection device 106*a*, 106*b*, 112*a*, 112*b*, the angular difference to horizontal of the narrowed field of view (horizontal detection plane 108*a*, 108*b*, 114*a*, 114*b*) can be angled in an upward or downward direction. The four PIR sensors 106*a*, 106*b*, 112*a*, 112*b* form four individual detection planes 108*a*, 108*b*, 114*a*, 114*b* which are paired to form detection zones. As stated above, the two vertically separated non overlapping detection planes 108*a* and 108*b* form one detection zone 110 and 114*a* and 114*b* form a second detection zone 116.

As shown in FIGS. 1A and 1B, detection planes 108*a* and 108*b* are separated by distance a and detection planes 114*a* and 114*b* are separated by distance a1. While distances a and a1 will remain constant throughout the detection zone 110, 116, it should be understood that distances a and a1 may also be adjusted by the user to increase or decrease the vertical gap between detection planes 108*a* and 108*b* or 114*a* and 114*b*. In any event, in order for a genuine trigger to be determined, a pair of detection planes 108*a* and 108*b* or 114*a* and 114*b* must be tripped concurrently. When both of these planes are tripped concurrently, the corner detection device 100 will deem it to be a genuine human trigger for that particular detection zone rather than a false alarm or false trigger.

As the detection device 100 is mounted externally on a building, the device may also be fitted with external solar panels 118*a*, 118*b*. These solar panels 118*a*, 118*b* may be used to harness solar energy to recharge batteries (not shown in FIGS. 1A and 1B) housed within the corner detection device 100 or to provide power to the corner detection device 100 directly without the use of batteries.

The right side 102*a* and the left side 102*b* of the detection device 100 may each contain a strobe light 120*a*, 120*b*, and a siren 134 to act as an intruder deterrent. When an intruder passes through one of the detection zones (i.e. either 110 or 116) (provided the detection device 100 is in an armed state), the detection device 100 considers that that alarm zone (i.e. either 110 or 116) has been triggered and (based on local settings), the strobe light (120*a*, 120*b*) and/or siren 134 of the detection device 100 will be activated as a first visual deterrent and/or audio deterrent to the intruder that it has been detected.

In a standalone implementation, the corner detection device 100 may determine its own arming and disarming state based on sunlight striking the solar panels 118*a*, 118*b* located on the corner detection device 100 to determine night from day. For example, after sensing that no sunlight is striking its solar panels, the corner detection device 100 may be automatically armed as the device will assume that it is night time. Similarly, after sensing that sunlight is striking its solar panels, the corner detection device 100 may be automatically disarmed as the device will assume that it is day time. Additionally, in its standalone armed state, a genuine human trigger of at least one zone 110 or 116 could initiate the visual deterrent 120*a*, 120*b* while a subsequent trigger of the second zone 110 or 116 could escalate by activating the audible deterrent, which may be a siren 134. These visual and audio deterrents may time out automatically. The standalone unit could also be Wi-Fi enabled for localised access and control by the user.

FIGS. 2A and 2B illustrate right and left side elevated perspective views of the rear side (i.e. the side that contacts the external surface of the building) of the detection device 100. The detection device 100 in the illustrated example uses a two-stage fixing system to allow for self-installation. A sticky gel medium 124 may be spread onto the external back surface 122*a*, 122*b* of each half 102*a*, 102*b* of the detection device 100, where 122*a* is the back of 102*a* and 122*b* is the back of 102*b*. A gum-like adhesive pad 126*a*, 126*b* is also mounted on the back surface 122*a*, 122*b* of each half 102*a*, 102*b* of the detection device 100. As shown in FIGS. 2A and 2B, PR sensors 106*a*, 106*b* are located on side 122*a* of corner detection device 100 and PR sensors 112*a* and 112*b* are located on side 122*b* of corner detection device 100.

To mount the detection device 100 onto the corner of a building, the detection device 100 is lined up on the building using the adhesive pads 126*a*, 126*b* and pushed against the building's surface. The adhesive pads 126*a*, 126*b* hold the corner detection device 100 in place while the sticky gel medium 124 cures. As the corner detection device 100 is designed to be mounted on the outside of a building, the double fixing system provided by the sticky gel medium 124 and the adhesive pads 126*a*, 126*b*, makes the detection device 100 difficult for an intruder to remove. The double fixing system may also be resistant to various weather conditions, including but not limited to rain, wind, and snow.

In another example of the present invention, the corner detection device 100 may also be installed or assembled on an inside corner of a building or structure, either on the exterior of the building or interior of the building. In this example, solar panels 118*a*, 118*b* may be located on surface 122*a* and 122*b* of the corner detection device 100 and the adhesive pads 126*a*, 126*b* and sticky gel medium 124 may be located on the front side of each half 102*a*, 102*b* of corner detection device to permit the corner detection device 100 to be installed or placed on an inside corner. The functionality of the corner detection device 100 may be the same regardless of whether the corner detection device 100 is installed on the inside corner or outside corner of a building or structure. Alternatively, the corner detection device 100 could be exclusively battery powered such that the device 100 can be used on both outside and inside corners. Optionally, solar panels 118*a*, 188*b* can be positioned on the top of the device 100 to also allow the same device to be affixed on both outside an inside corners.

It should be understood that while the corner detection device illustrated in FIGS. 1A, 1B, 2A and 2B show the corner detection device fixed in a 90 degree angle, any fixed angle ranging from 45 degree to 300 degree may be incorporated. In another example, the casing 102 may not be fixed and may be capable of pivoting along its central axis 104 to create various angles from one corner detection device. It should also be understood that any flexible material may be utilized on the central axis 104 to allow the casing 102 to create various angles as desired by the user or as required by the building or structure in which the corner detection device 100 is to be installed.

Figure 3A:
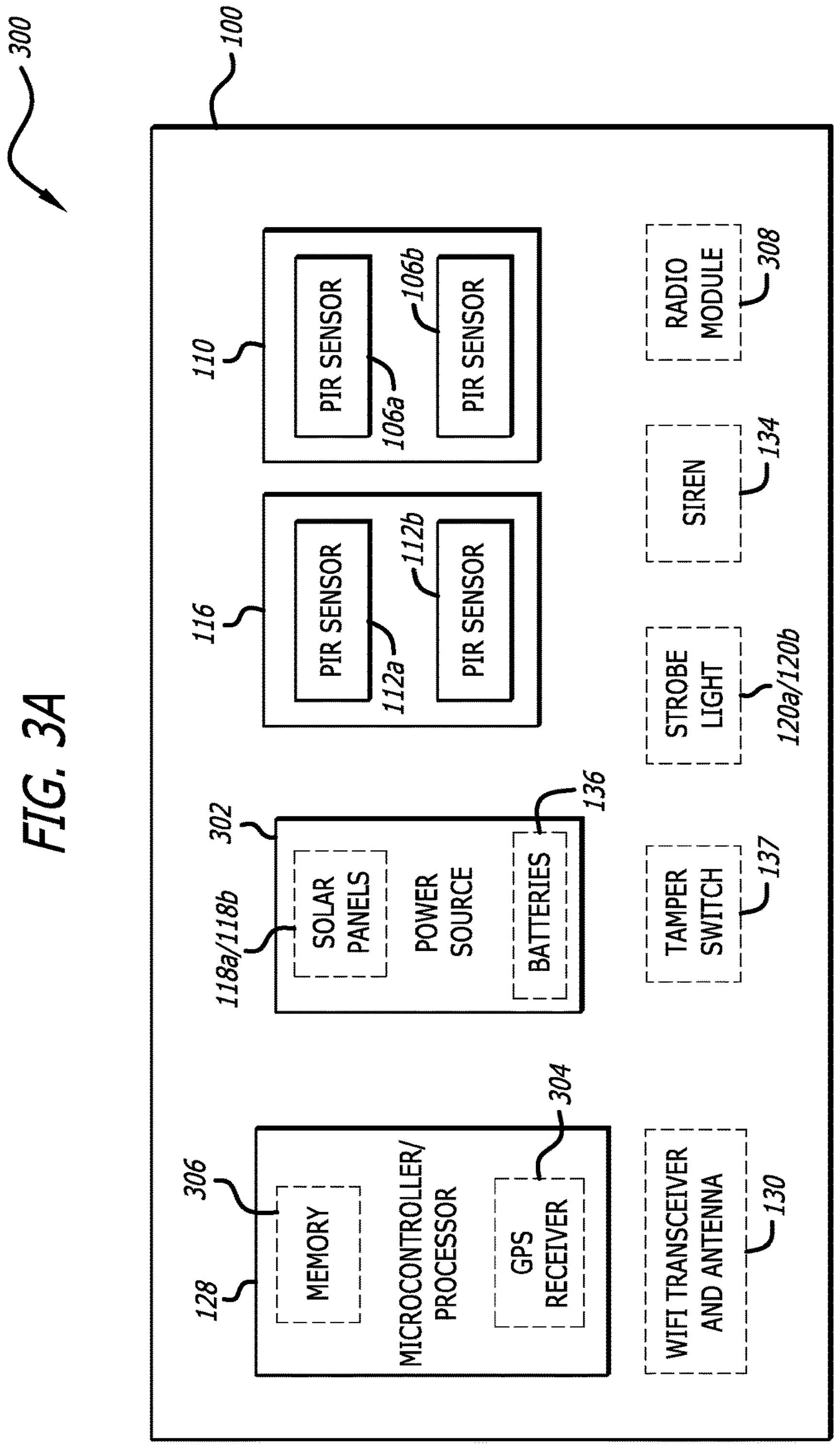
FIG. 3A is a block diagram of one example of components contained within the housing of the corner detection device of the present invention.
Figure 3B:
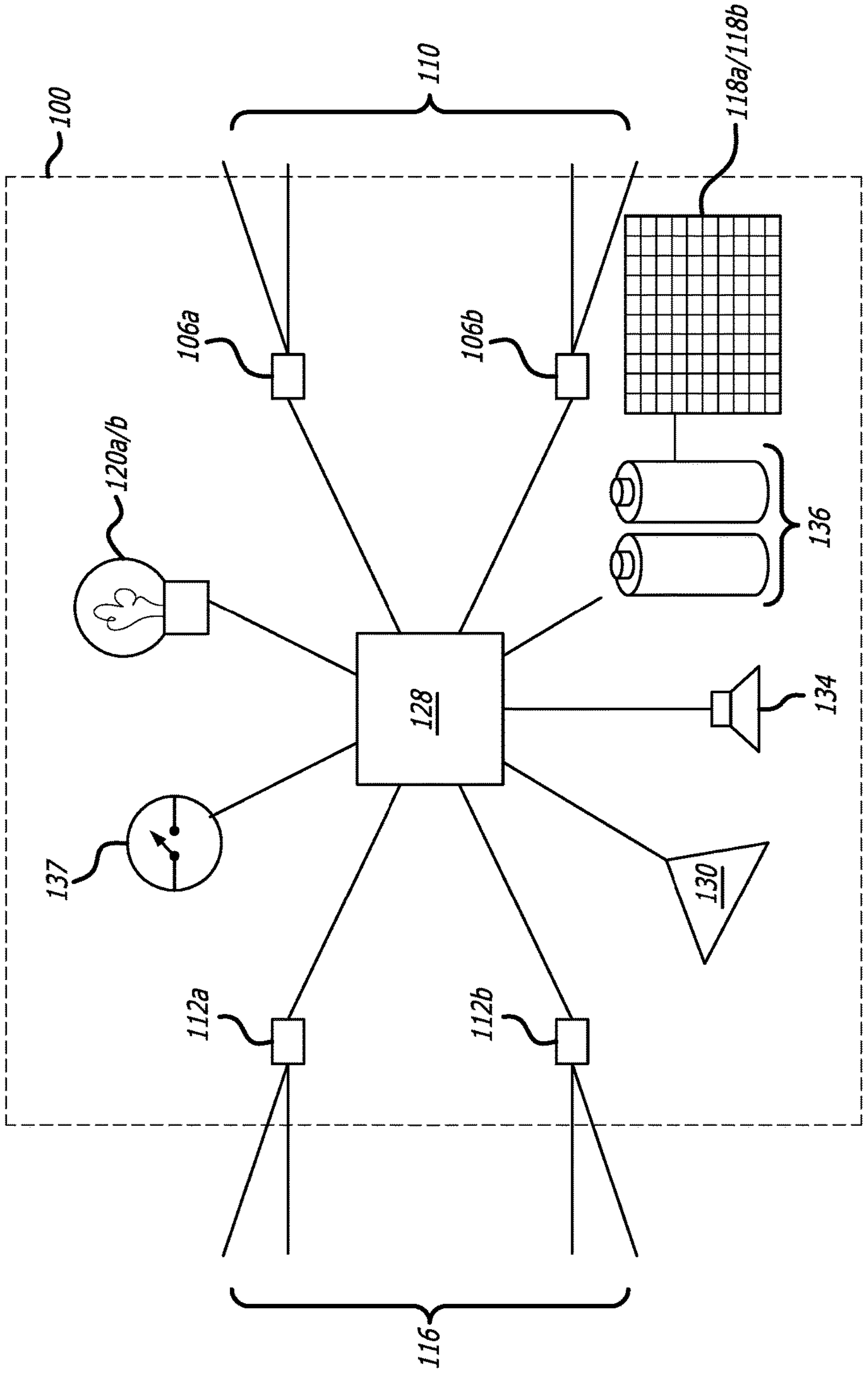
FIG. 3B is a connection diagram showing the main components contained within the housing of the corner detection device of the present invention.

FIGS. 3A and 3B illustrate a connection diagram and block diagram 300 of one example of components that may be contained within the housing of corner detection device 100. As illustrated in FIGS. 3A and 3B, the corner detection device 100 may include a microcontroller/processor 128 with operating system. The microcontroller/processor 128 may also include a memory 306 and a GPS receiver 304 (used for geographically locating the corner detection device 100 through geotagging), and sufficient processing power to conduct various controls and computing operations for controlling the corner detection device 100. The microcontroller/processor 128 may be powered from a power source 302, such as batteries 136 or solar panels 118*a*/118*b* having solar cells. In some examples, solar panels 118*a*/118*b* may be used in combination with batteries 136 to recharge batteries 136 when batteries are low. Additionally, the microcontroller/processor 128 may monitor the level of the rechargeable batteries 136 and may report the charge levels via the self-propagating data communications network 400 to the community server 402.

The microcontroller/processor 128 may further be coupled to PIR sensors 106*a*, 106*b*, 112*a*, 112*b* to determine whether an alarm zone 110, 116 has been triggered. Optionally, the corner detection device 100 may include Wi-Fi transceiver and antennae 130, tamper switch 137, strobe light 120*a*/120*b*, and siren 134.

The microcontroller/processor 128 may communicate wirelessly with a device, such as a smartphone, computer, tablet, through a radio module 308 such as Bluetooth or through Wi-Fi 130. The microcontroller/processor 128 may also communicate with a network node, such as a Wi-Fi access point or hotspot, a cellular network infrastructure component, or a server. Communications may be direct or through intermediate communication links, such as one or more network nodes or other communication devices. The radio module 108 may be configured to switch between cellular and Wi-Fi connections and even maintain multiple connections.

Figure 4:
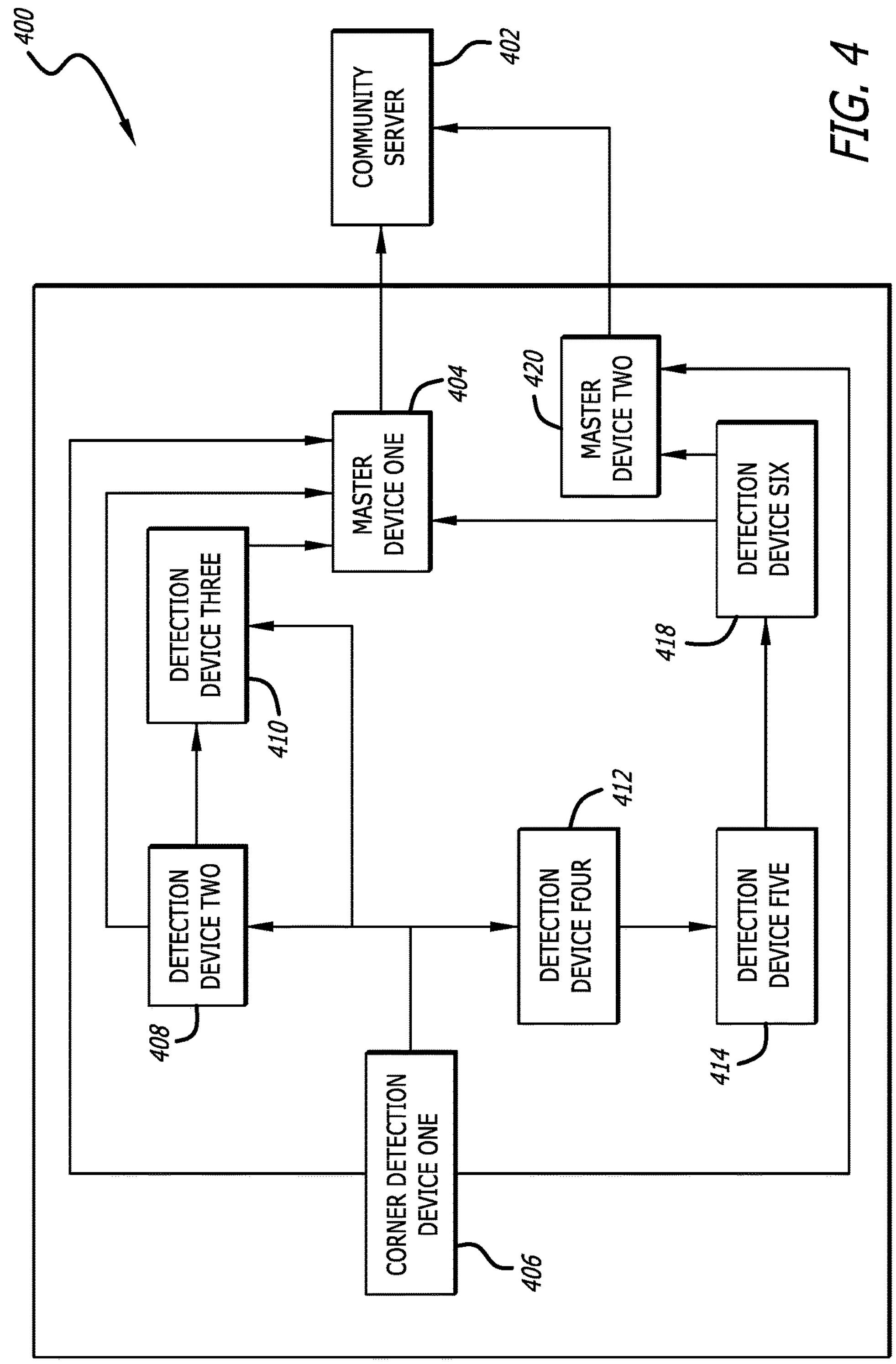
FIG. 4 is a flow chart illustrating one example of possible communication pathways of the self-propagating data communications network from the corner detection device of the present invention through to a community server.

In another example, the microcontroller/processor 128 may act on predetermined settings and/or instructions sent by the self-propagating data communications network 400 described in FIG. 4. If it is determined that an alarm zone 110, 116 is triggered, the microcontroller/processor 128 may use Wi-Fi transceiver and antennae 130 to send a message by the self-propagating data communications network 400 to a community server 402. The Wi-Fi transceiver and antennae 130 may also be used to receive messages from the self-propagating data communications network 400 and forward them on to the microcontroller/processor 128 for processing. Acting on predetermined settings or settings delivered from the community server 402 through the self-propagating data communications network 400, the microcontroller/processor 128 may make intelligent determinations when to initiate a strobe light 120*a*, 120*b* and/or a siren 134 to act as an intruder deterrent.

The optional tamper switch 137 may determine whether the corner detection device 100 is being removed from its fixing surface. The tamper switch 137 may be a mechanical contact such as a lever pressing against a wall or a gravity sensitive switch such as a mercury switch. Other forms of spatial and orientation detection methods may also be employed. The microcontroller/processor 128, detecting a tamper condition, may send a message via the self-propagating communications data network 400 and activate all local deterrents immediately.

It should further be noted that while FIGS. 3A and 3B illustrates one microcontroller/processor 128 that controls all of the components of the corner detection device 100, in another example of the present invention, each half 102*a* or 102*b* of the corner detection device 100 may include its own microcontroller/processor 128. In the case where each half 102*a* or 102*b* of the corner detection device 100 may include its own microcontroller/processor, it should further be understood that the microcontroller/processor in each half will only be able to control/process the PIR sensors located on that half of the casing 102. For example, should a microcontroller/processor be located on half 102*b*, the microcontroller/processor will be able to control PIR sensors 112*a*, 112*b* but will not be able to control 106*a*, 106*b*. Aside from the PIR sensors, the microcontroller/processor located in each half may include all other components described in FIGS. 3A and 3B. In implementations where each half is pivotally connected to the other such that the halves are physically separate, each half may include identical components and operate separately.

FIG. 4 illustrates one example of possible communication pathways of the self-propagating data communications network 400 from the corner detection device 406 of the present invention through to a community server 402. It should be understood that corner detection device 406 may be corner detection device 100 as illustrated and described in FIGS. 1-2. The corner detection device 406 may contain a radio communications module (not shown), which is used to communicate through the self-propagating data communications network 400. Corner detection device 406 may use the self-propagating data communications network 400 to communicate with a master device such as master device one 404, which in turn acts as a gateway to the community server 402 by the Internet.

In FIG. 4, corner detection device 406 attempts to communicate with master device one 404 by way of the shortest path, i.e. directly. If corner detection device 406 is unable to communicate with master device one 404 using this direct pathway, it will look for an alternative or indirect path. In order for corner detection device 406 to communicate with master device one 404 it may have to find a path using other detection devices. For example, corner detection device 406 may use corner detection device two 408 and corner detection device three 410 as repeaters in order to reach master device one 404. If master device one 404 is unavailable then corner detection device 406 may need to use corner detection devices 412, 414 and 418 to act as repeaters so that corner detection device 406 can reach master device two 420 to find access to the internet and communicate to the community server 402. A similar method but in reverse may be utilized when the community server 402 needs to send a control action through the self-propagating data communications network 400 to corner detection device 406. It should be understood that any number of master devices or corner detection devices may be used in accordance with the present invention to create communication pathways of the self-propagating data communications network 400 from the corner detection device 100 of the present invention through to a community server 402 and vice versa.

On receipt of the control action from the community server 402, master devices 404 or 420 will attempt to communicate with corner detection device 406 directly through the self-propagating data communications network 400. If it is unable to form this direct connection, master device 404 or master device 420 will forward the message to corner detection device 406 through the self-propagating data communications network using other corner detection devices as repeaters (i.e. corner detection devices 408, 410, 412, 414, 418).

If the corner detection unit 100 or 406 is operating in a standalone mode then the Wi-Fi transceiver and antenna 130 would be configured as a conventional Wi-Fi device to be connected with and accessed via a personal mobile device including but not limited to mobile phone, computer, or tablet.

Figure 5:
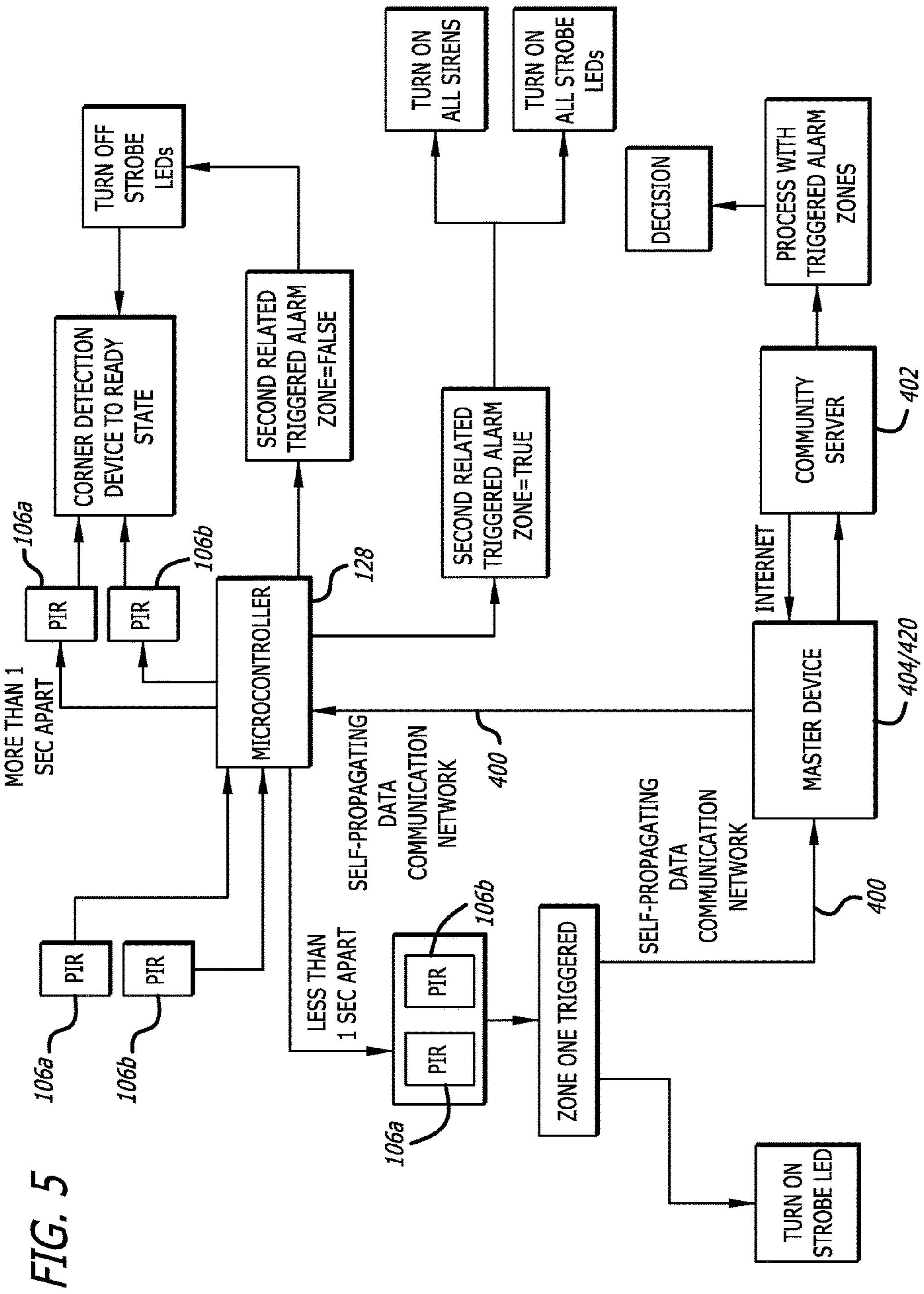
FIG. 5 is a flow chart illustrating one example of an embodiment of a zone function of the corner detection device of the present invention.

FIG. 5 is a flow chart illustrating one example of the function of a zone of the corner detection device 102 of the present invention. While FIG. 5 illustrates and describes the zone function of 110, it should be understood that that the function of zone 116 may also be the same. As described in FIG. 5, for a detection to be deemed valid, zone one 110 of FIG. 1 needs to be triggered. A PIR sensor 106*a* or 106*b* of FIG. 1 is tripped by a possible intruder. This trip is timed for a period of up to one second (or other predetermined time period) by a timer within the microcontroller 128 of FIGS. 3A and 3B. If the other PIR sensor 106*a* or 106*b* is not tripped within this one second window, then the internal microcontroller 128 will deem that a zone has not been triggered and return the corner detection device 102 to a ready state. If PIR sensor 106*a*, 106*b* are both tripped within the one second window, the microcontroller 128 will deem that a detection zone 110 has been triggered. The internal microcontroller 128 will turn on the strobe lights 120*a/b* based on its local settings as an initial deterrent to alert the intruder that they have been seen. The microcontroller 128 may then send a message through the self-propagating data communications network 400 to a master device 404, 420 which in turn forwards the message to the community server 402 through the Internet (this communication may be accomplished by the communication pathways described in FIG. 4). The community server 402 processes the triggered zone 110, along with other community triggered alarm zones to determine whether further action needs to be taken. If the community server 402 determines that no other relevant community alarm zones have been triggered then the community server 402 will send a message through the Internet to a master device 404/420 and master device 404/420 will forward the message through the self-propagating data network 400 to the corner detection device 102 microcontroller 128 to turn off the strobe lights 120*a*, 102*b*. The microcontroller 128 will then turn off the strobe light 120*a* and return alarm zone one 110 of the corner detection device 102 to a ready state. If the community server 404 has determined that other relevant community alarm zones, such as zone 116 within the same corner detection device 102 or another neighboring zone, based on the GPS co-ordinate tagging recorded against each corner detection device 102, has been triggered then the community server 402 will send a message back through the Internet and master device 406/420 and the self-propagating data network 400 to the microcontroller 128 of the corner detection device 102 to activate all of its sensory alerts, such as strobe lights 120*a*, 102*b* and sirens 134 of FIGS. 3*a* and 3*b*, thus escalating the deterrent. Thus, the system of the present invention, through the use of the self-propagating data communication network 400 may adequately deter intruders from individual homes or buildings but may also deter intruders from an entire community as a whole. It is also possible for the corner detection device 102 to act in a standalone manner by having it self-monitor both detection zones 110 and 116.

FIG. 6 is one example of the corner detection devices 100 of the present invention in operation. As shown in FIG. 6, the corner detection device 100 of the present invention may be installed or attached to the corners of buildings to create detection zones that span across the sides of the building. Ideally, the corner detection device 100 may be installed on the corner of a building such that the detection zones cover any potential points of entry (i.e. doors, windows garage doors etc.) that an intruder may use to enter the building.

In operation, when an intruder passes through one of the detection zones (i.e. either 110 or 116) (provided the detection device 100 is in an armed state), the detection device 100 considers that that alarm zone (i.e. either 110 or 116) has been triggered and (based on local settings), the strobe light (120*a*, 120*b*) and/or siren 134 of the detection device 100 will be activated as a first visual deterrent and/or audio deterrent to the intruder that it has been detected. As shown in FIG. 6, the combination of multiple corner detection devices 100 may allow sufficient coverage around any particular building or structure.

It will further be understood, and is appreciated by persons skilled in the art, that one or more processes, sub-processes, or process steps in the measuring device described above may be performed by hardware and/or software. If the process is performed by software, the software may reside in software memory (not shown) in a suitable electronic processing component or system such as one or more of the functional components or modules described above. The software in software memory may include an ordered listing of executable instructions for implementing logical functions (that is, "logic" that may be implemented either in digital form such as digital circuitry or source code or in analog form such as analog circuitry or an analog source such an analog electrical, sound or video signal), and may selectively be embodied in any computer-readable medium for use by or in connection with an instruction execution system, apparatus or device, such as a computer-based system, processor-containing system, or other system that may selectively fetch the instructions from the instruction execution system, apparatus or device and execute the instructions. In the context of this disclosure, a "computer-readable medium" is any means that may contain, store or communicate the program for use by or in connection with the instruction execution system, apparatus, or device. The computer readable medium may selectively be, for example, but is not limited to, an electronic, magnetic, optical, electromagnetic, infrared or semiconductor system, apparatus or device. More specific examples, but nonetheless a non-exhaustive list, of computer-readable media would include the following: a portable computer diskette (magnetic), a RAM (electronic), a read-only memory "ROM" (electronic), an erasable programmable read-only memory (EPROM or Flash memory) (electronic) and a portable compact disc read-only memory "CDROM" (optical). Note that the computer-readable medium may even be paper or another suitable medium upon which the program is printed, as the program can be electronically captured, via for instance optical scanning of the paper or other medium, then compiled, interpreted or otherwise processed in a suitable manner if necessary, and then stored in a computer memory.

It will be understood that the term "in signal communication" as used herein means that two or more systems, devices, components, modules, or sub-modules are capable of communicating with each other via signals that travel over some type of signal path. The signals may be communication, power, data, or energy signals, which may communicate information, power, or energy from a first system, device, component, module or sub-module to a second system, device, component, module or sub-module along a signal path between the first and second system, device, component, module or sub-module. The signal paths may include physical, electrical, magnetic, electromagnetic, electrochemical, optical, wired or wireless connections. The signal paths may also include additional systems, devices, components, modules or sub-modules between the first and second system, device, component, module, or sub-module.

More generally, terms such as "communicate" and "in . . . communication with" (for example, a first component "communicates with" or "is in communication with" a second component) are used herein to indicate a structural, functional, mechanical, electrical, signal, optical, magnetic, electromagnetic, ionic or fluidic relationship between two or more components or elements. As such, the fact that one component is said to communicate with a second component is not intended to exclude the possibility that additional components may be present between, and/or operatively associated or engaged with, the first and second components.

It will be understood that various aspects or details of the invention may be changed without departing from the scope of the invention. The foregoing description of implementations has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

We claim:

1. A security detection device for mounting on a corner of a structure where first and second adjacent walls extend from the corner of the structure, the security detection device having a central axis and two halves extending from the central axis where each half has a front side and a rear side and where the rear sides of the two halves are positioned in spaced angled relationship towards one another such that the rear side of one half of the security detection device abuts the first wall of the structure and the rear side of the other half of the security detection device abuts the second wall of the structure and where each half of the security detection device includes passive infrared sensors and where the security detection device further includes a microcontroller and a power source; and wherein the two halves are pivotally connected to one another along the central axis and may be moved in angled relationship to one another.

2. The security detection device of claim 1, where the security detection device may be mounted on an internal or external corner of a structure.

3. The security detection device of claim 1, where the security detection device is wireless.

4. The security detection device of claim 1, where the security detection device further includes solar panels for providing solar power to the power source.

5. The security detection device of claim 1, where the security detection device is Wi-Fi enabled such that it can be controlled from a mobile device through the Internet.

6. The security detection device of claim 1, where the security detection device further includes visual and audible deterrent devices.

7. The security detection device of claim 1, where the microcontroller communicates with a community server via a self-propagating data communications network.

8. The security detection device of claim 1, where the passive infrared sensors on each half form separate detection planes that do not overlap.

9. The security detection device of claim 1, where the security detection device is tagged with geo-coordinate equipment.

10. A method for reducing false security alarm triggers, the method comprising the step of providing a security detection device for placement on or along the corner of a structure, the security detection device having two halves directly abutted along a central axis where each half has a front side and a rear side and where the rear sides of the two halves are positioned in an open spaced angled relationship towards one another about the central axis and where each half includes at least two passive infrared sensors, where the at least two passive infrared sensors on each half form separate detection planes that do not overlap, and where the detection planes on each half must be tripped concurrently to trigger a security alarm; and wherein the two halves are pivotally connected to one another along the central axis and may be moved in angled relationship to one another.

11. The method of claim 10, where the detection planes on each half must be tripped within one second of each other to trigger the security alarm.

12. The method of claim 11, where the security alarm comprises of an audible or visual deterrent.

13. The method of claim 11, where the detection planes on each half will not trigger the security alarm if not tripped within one second of each other.

14. A security detection device having two halves directly abutted along a central axis where each half has a front side and a rear side and where the rear sides of the two halves are positioned in an open spaced angled relationship towards one another about the central axis such that the rear sides of each half of the security detection device may be affixed in or on the corner of a structure and where each half includes at least two passive infrared sensors, where the at least two passive infrared sensors on each half form separate detection planes that do not overlap, and where the detection planes on each half must be tripped concurrently to trigger a security alarm; and wherein the two halves are pivotally connected to one another along the central axis and may be moved in angled relationship to one another.

15. The security detection device of claim 14 where the two halves are positioned at a right angle relative to one another.

16. The method of claim 10 further including the step of providing a plurality of security detection devices each having a communication device for communicating with a communication server for a community security alarm system via a communications data network, where the communications data network allows the plurality of security detection devices to communicate with the community server via a master device either directly or indirectly through at least one other of the plurality of security detections.

17. The method of claim 16, where the triggering of an alarm on at least one of the security detection devices notifies the community server via the communications data network.

18. The method of claim 16 further including the step of providing audible or visual deterrent alerts on the plurality of security detection devices and activating all audio or visual deterrent alerts on the plurality of security detection devices if a security alarm has been triggered by at least one other of the plurality of security detection devices.

19. The method claim 16, where all of the plurality of security detection devices are tagged with geo-coordinate equipment that allows each of the plurality of security detection device to be recorded on the community server so that alarm triggers can be shared.

* * * * *